Patented Apr. 19, 1938

2,114,798

UNITED STATES PATENT OFFICE

2,114,798

METHOD OF MAKING MALEIC ACID AND ANHYDRIDE

Harold B. Foster, Williamsville, N. Y., assignor to National Aniline and Chemical Company, Inc., New York, N. Y., a corporation of New York No Drawing. Application July 10, 1935, Serial No. 30,635

15 Claims. (Cl. 260—116)

This invention relates to the manufacture of maleic anhydride and maleic acid by the partial oxidation of polynuclear aromatic compounds.

Heretofore it has been known that certain mononuclear aromatic compounds such as benzene, toluene, etc. and certain polynuclear condensed aromatic compounds, such as naphthalene, anthracene, phenanthrene, etc., may, when subjected to the action of an oxidizing gas at an elevated temperature and in the presence of a suitable catalyst, undergo oxidative degradation whereby the benzene nuclei therein are broken down to form selective or partial oxidation products.

In accordance with the present invention, aromatic compounds containing at least two benzene nuclei joined by a single bridge, for example compounds of the diphenyl type, are subjected to partial or selective oxidation to yield maleic anhydride. To accomplish this limited oxidation satisfactorily, it is necessary to bring a mixture of the aromatic compound and an oxidizing gas preferably in a ratio of oxidizing gas to compound in excess of that theoretically required to effect complete oxidation to carbon dioxide and water into contact with an oxidation catalyst. Particularly applicable are those compounds of the type indicated which melt or vaporize below about 220° C.

While the catalyst should be maintained at a high temperature to insure the desired oxidation, at temperatures above about 550° C. the degree of oxidation tends to be increased with formation of carbon dioxide and water, thus materially reducing the output of the desired product. Normally the temperature of the catalyst may be maintained between about 400° C. and about 550° C., and under the preferred conditions of operation the optimum operating temperature is about 500° C. A converter of the types employed for catalytic oxidation of benzene or naphthalene is satisfactory for the present process. As will be recognized by those skilled in the art, the temperature may vary in different parts of the catalyst bed and the temperatures specified are referred to the main portion of the catalyst. With the customary converters, catalysts near the entrance and exit and near the walls of the converter may be at a somewhat lower temperature while the maximum temperature may be slightly higher.

Except as above limited, the ratio of oxidizing gas to oxidizable constituent may be varied widely depending upon the oxidizable constituent and upon the conditions under which the oxidation is to take place. The term "oxidizing gas", as used herein, is intended to be construed broadly to include any gas consisting of or containing oxygen. Thus, oxygen, air, or oxygen mixed with any inert diluent, is covered by this term. It has been found that the maximum yield and greatest purity of maleic anhydride or maleic acid may be obtained by utilizing a reaction mixture in which the amount of oxygen present is about 1.5 to about 3 times the amount theoretically required for complete oxidation of the oxidizable constituent to carbon dioxide and water. For example, in the oxidation of diphenyl using air as the oxidizing gas, about 15 to about 45 parts by weight thereof may be used per part by weight of diphenyl. Under the preferred conditions of operation, about 25 to about 35 parts should be used.

It is known that oxidation reactions take place more readily in the presence of some catalysts than with others. In the process of the present invention a vanadium oxide catalyst may be used to advantage, preferably a catalyst comprising vanadium oxide admixed with a small proportion of another metallic oxide, such as for example, molybdenum oxide. The catalyst mass may be appropriately placed in the converter either as such or distributed on a catalyst carrier such as alundum, asbestos, etc. in such a manner as to provide easy and efficient contact of the gaseous reaction mixture therewith.

As will be well understood by those skilled in this art, the time of contact of the gaseous reaction mixture with the hot catalyst mass has a bearing upon the oxidation products obtained. For example, by reducing the rate of flow of the reaction mixture through the catalyst mass, the extent of oxidation may be increased and the proportion of carbon dioxide and water in the exit gases correspondingly augmented.

The process of this invention may be operated under various pressures, for example pressures from about 1 atmosphere absolute to about 3 atmospheres absolute may be used to advantage. Preferably the reaction is carried out under a pressure of about 2.5 atmospheres absolute.

The maleic anhydride which is produced by the oxidation reaction above described, may be separated from the exit gases in any suitable manner. For example the exit gases may be passed through a condenser, in which a temperature is maintained below the precipitation temperature or dewpoint for maleic anhydride, and the maleic anhydride separated thereby, the remaining gases being passed through scrubbers containing water or other solvents whereby the residual maleic anhydride or maleic acid and other products of the oxidation not removed by the condensation may be absorbed or washed from the gases, or if desired the hot exit gases may be directly treated with solvents which are capable of abstracting maleic anhydride or maleic acid. A part of the residual gas may be recirculated as a diluent for the oxygen-containing gas introduced into the converter with the compound to be oxidized.

The invention particularly comprehends compounds of the diphenyl type, for example diphenyl and its homologues and the following example of the preparation of maleic acid and anhydride from diphenyl is given as illustrative of the process of this invention, the proportions denoted therein being parts by weight:

*Example.*—1 part of diphenyl in the vapor phase are admixed with about 35 parts of air; the gas mixture thus obtained was passed into a converter under a pressure of about 2.5 atmospheres absolute and into contact with a catalytic mass consisting of a mixture of vanadium oxide and molybdenum oxide on an alundum carrier. The temperature of said catalytic mass was maintained at about 500° C. and the rate of flow of the gas mixture through the converter was so adjusted that the time of contact of said mixture with the catalyst mass was between about .15 and about .3 second, say about 0.25 second. The gases leaving the converter were passed through a condenser in which they were cooled to about 130° C. and were then passed into contact with water whereby an aqueous solution of maleic acid containing a small proportion of fumaric acid was formed.

As will be understood, the present invention is not limited to the specific details of operation described above and certain changes may be made without departing from the scope thereof.

For example, it will be appreciated that the conditions of operation of the process hereinabove described are interrelated and that a slight change in one of said conditions may be compensated by a change in certain of the others. For example, if it is desired to operate at higher temperatures, the rate of flow of gas through the converter may be increased or vice versa.

If desired, diluents other than nitrogen may be used in the above process. In this connection it may be noted that any water which is formed during the reaction or which is introduced with the reaction mixture is converted to steam at the high temperatures prevailing in the converter, thus serving to dilute the reaction mixture. Furthermore, if desired, a part or all of the residual gases which remain after separation of maleic acid therefrom may be recirculated as diluent gas, being admixed with the appropriate quantity of oxygen to provide the preferred concentration thereof.

The process of this invention also may be applied to the selective oxidation of other polynuclear aromatic compounds in which two benzene rings are joined by a single bridge, e. g. ditolyl, diphenylbenzene, methoxy phenyl benzene, methoxyphenylphenol, triphenylbenzene, diphenylmethane, diphenylethane, triphenylmethane, diphenyl carbinol, triphenol carbinol, benzophenone, etc.

In the following claims the term "maleic acid" is used to cover broadly maleic anhydride and maleic acid.

I claim:

1. A process for the selective oxidation of an aromatic compound containing at least two benzene nuclei joined by a single bridge, which comprises subjecting said compound to catalytic vapor phase oxidation at a temperature below about 550° C. in the presence of an oxidizing gas, the oxygen content of said gas being greater than that theoretically required for complete oxidation of said compound to carbon dioxide and water.

2. A process for the selective oxidation of an aromatic compound containing at least two benzene nuclei joined by a single bridge free from elements other than carbon, hydrogen and oxygen, which comprises subjecting said compound to catalytic vapor phase oxidation at a temperature between about 400° C. and about 550° C. in the presence of an oxidizing gas, the oxygen content of said gas being greater than that theoretically required for complete oxidation of said compound to carbon dioxide and water.

3. A process for the selective oxidation of a diphenyl, which comprises forming a mixture of vapor of the diphenyl and an oxidizing gas in such proportion that the oxygen content of said mixture is from about 1.5 to about 3 times the amount theoretically required for complete oxidation of the diphenyl to carbon dioxide and water, and passing the resulting gaseous mixture at a temperature below about 550° C. into contact with an oxidation catalyst which contains a substantial proportion of vanadium oxide.

4. A process for the selective oxidation of a diphenyl, which comprises forming a mixture of vapor of the diphenyl and an amount of air equal to about 15 to about 45 times the amount of the diphenyl in said mixture, and passing the gaseous mixture thus formed into contact with an oxidation catalyst comprising a mixture of vanadium oxide and molybdenum oxide and maintained at a temperature between about 400° C. and about 550° C.

5. A process for the manufacture of maleic acid by the selective oxidation of diphenyl, which comprises admixing vapors of diphenyl with an oxidizing gas, the oxygen content of said oxidizing gas being greater than that theoretically required for the complete oxidation of diphenyl to carbon dioxide and water, and passing the gaseous mixture thus formed into contact with an oxidation catalyst at a temperature between about 400° C. and about 550° C.

6. A process for the manufacture of maleic acid by the selective oxidation of diphenyl, which comprises admixing vapors of diphenyl with an oxidizing gas, the oxygen content of said oxidizing gas being about 1.5 to about 3 times the amount theoretically required for complete oxidation of diphenyl to carbon dioxide and water, and passing the gaseous reaction mixture thus formed into contact with an oxidation catalyst containing a substantial proportion of vanadium oxide, the temperature of said oxidation catalyst being maintained between about 400° C. and about 550° C.

7. A process for the manufacture of maleic acid by the selective oxidation of diphenyl, which comprises admixing vapors of diphenyl with about 15 to about 45 times the weight thereof of air, passing the resulting gaseous reaction mixture under a pressure of from about 1 to about 3 atmospheres absolute into contact with an oxidation catalyst containing a substantial proportion of vanadium oxide, the temperature of said oxidation catalyst being maintained between about 400° C. and about 550° C.

8. A process for the manufacture of maleic acid by the selective oxidation of diphenyl, which comprises admixing vapors of diphenyl with air to form a mixture having an oxygen content greater than that theoretically required for complete oxidation of the diphenyl to carbon dioxide and water, passing the resulting gaseous mixture under pressure of from about 1 to about 3 atmospheres absolute into contact with a vanadium oxide catalyst maintained at about 400° C. to about 550° C.

9. A process for the manufacture of maleic acid by the selective oxidation of diphenyl, which comprises admixing vapors of diphenyl with an amount of air equal to about 15 to about 45 times the weight thereof, passing the resulting gaseous reaction mixture under a pressure of from about 1 to about 3 atmospheres absolute into contact with an oxidation catalyst containing a mixture of vanadium oxide and molybdenum oxide, regulating the time of contact of said gaseous reaction mixture with said oxidation catalyst between about .15 and about .3 second, and maintaining the temperature of said catalyst at about 500° C.

10. A process for the manufacture of maleic acid by the selective oxidation of diphenyl, which comprises admixing vapors of diphenyl with about 25 to about 35 times the weight thereof of air, passing the resulting gaseous mixture under pressure of from about 1 to about 3 atmospheres absolute into contact with an oxidation catalyst containing vanadium oxide and molybdenum oxide, regulating the time of contact of said reaction mixture with said catalyst to about .25 second and maintaining the temperature of said catalyst at about 500° C.

11. A process for the manufacture of maleic acid by the selective oxidation of diphenyl, which comprises admixing vapors of diphenyl with an amount of air equal to about 15 to about 45 times the weight thereof, passing the resulting gaseous reaction mixture under a pressure of about 2.5 atmospheres absolute into contact with an oxidation catalyst containing vanadium oxide and molybdenum oxide maintained between about 400° and about 550° C., and cooling the resulting gaseous mixture to condense maleic acid.

12. A process for the manufacture of maleic acid by the selective oxidation of diphenyl, which comprises admixing vapors of diphenyl with an amount of air equal to about 15 to about 45 times the weight thereof, passing the resulting gaseous reaction mixture under a pressure of about 2.5 atmospheres absolute into contact with an oxidation catalyst consisting of vanadium oxide and molybdenum oxide maintained between about 400° and about 550° C., passing the resulting gaseous mixture into contact with a solvent for maleic acid whereby said maleic acid is abstracted from said gaseous mixture, and separating maleic acid from solvent.

13. A process for the selective oxidation of an aromatic compound containing at least two benzene nuclei joined by a single bridge through carbon atoms only, which comprises subjecting said compound to catalytic vapor phase oxidation at a temperature below about 550° C. in the presence of an oxidizing gas, the oxygen content of said gas being greater than that theoretically required for complete oxidation of said compound to carbon dioxide and water.

14. A process for the selective oxidation of an aromatic compound containing at least two benzene nuclei joined by a single bridge through carbon atoms only, which comprises forming a mixture of vapor of said compound and an amount of an oxidizing gas equal to about 15 to about 45 times the amount of said compound in said mixture, and passing the gaseous mixture thus formed into contact with an oxidation catalyst comprising a mixture of vanadium oxide and molybdenum oxide, maintained at a temperature between about 400° C. and about 550° C.

15. A process for the manufacture of maleic acid by the selective oxidation of diphenyl, which comprises forming a mixture of diphenyl vapor and an oxidizing gas having an oxygen content greater than that theoretically required for complete oxidation of diphenyl to carbon dioxide and water, and passing the resultant gaseous mixture at a temperature below about 550° C. into contact with a vanadium oxide molybdenum oxide catalyst.

HAROLD B. FOSTER.